(12) United States Patent
Jacobsen et al.

(10) Patent No.: US 8,586,179 B1
(45) Date of Patent: Nov. 19, 2013

(54) MECHANICAL ATTACHMENT FOR MICRO-TRUSS ACTIVELY COOLED STRUCTURAL INSULATION LAYER

(75) Inventors: Alan J. Jacobsen, Woodland Hills, CA (US); Stephen E. Lehman, Golden Eagle, IL (US); Robert E. Doty, Los Angeles, CA (US)

(73) Assignee: The Boeing Company, Chicago, IL (US)

(*) Notice: Subject to any disclaimer, the term of this patent is extended or adjusted under 35 U.S.C. 154(b) by 283 days.

(21) Appl. No.: 12/757,965

(22) Filed: Apr. 9, 2010

(51) Int. Cl.
*B32B 3/00* (2006.01)
*B32B 3/26* (2006.01)

(52) U.S. Cl.
USPC .............. 428/315.5; 428/315.7; 52/506.02

(58) Field of Classification Search
USPC ........... 52/506.02, 648.1, 145, 404.3, 782.1, 52/652.1, 654.1; 428/60, 319.7, 58, 105, 428/113, 61, 62, 56, 102, 137, 315.5, 428/315.7; 29/897.34, 505, 509, 514, 29/889.7; 126/706; 60/302
See application file for complete search history.

(56) References Cited

U.S. PATENT DOCUMENTS

| | | | | |
|---|---|---|---|---|
| 3,579,411 A * | 5/1971 | Mackie et qal. | ............... | 428/102 |
| 4,219,597 A * | 8/1980 | Maistre | ........................ | 428/105 |
| 4,299,871 A | 11/1981 | Forsch | | |
| 4,531,511 A * | 7/1985 | Hochberg | ..................... | 126/706 |
| 4,654,314 A * | 3/1987 | Takagi et al. | ................... | 501/82 |
| 4,735,026 A * | 4/1988 | Forsythe | ....................... | 52/404.3 |
| 4,937,210 A * | 6/1990 | Jones et al. | ...................... | 501/80 |
| 5,185,297 A * | 2/1993 | Park et al. | ........................ | 501/80 |
| 5,275,383 A | 1/1994 | Wick et al. | | |
| 5,441,919 A * | 8/1995 | Park et al. | ........................ | 501/80 |
| 5,501,906 A | 3/1996 | Deve | | |
| 5,624,622 A * | 4/1997 | Boyce et al. | ................... | 264/258 |
| 5,657,795 A | 8/1997 | Sawko et al. | | |
| 5,741,574 A | 4/1998 | Boyce et al. | | |
| 5,937,641 A * | 8/1999 | Graham et al. | ................. | 60/302 |
| 6,076,324 A * | 6/2000 | Daily et al. | ................... | 52/648.1 |
| 6,142,451 A | 11/2000 | Lindsey et al. | | |
| 6,740,381 B2 * | 5/2004 | Day et al. | ........................ | 428/56 |
| 7,382,959 B1 | 6/2008 | Jacobsen | | |
| 7,393,577 B2 * | 7/2008 | Day et al. | ....................... | 428/121 |
| 7,424,967 B2 * | 9/2008 | Ervin et al. | ................... | 228/193 |
| 7,485,354 B2 * | 2/2009 | Bohner et al. | .................. | 428/60 |
| 7,653,279 B1 | 1/2010 | Jacobsen | | |
| 7,687,132 B1 | 3/2010 | Gross et al. | | |
| 7,913,611 B2 * | 3/2011 | Terry et al. | ................... | 89/36.02 |
| 7,963,085 B2 * | 6/2011 | Sypeck et al. | ............... | 52/782.1 |
| 8,046,915 B2 * | 11/2011 | Xie et al. | ...................... | 29/889.7 |
| 8,061,966 B2 * | 11/2011 | Xie et al. | ........................... | 415/9 |

OTHER PUBLICATIONS

Integral Textile Ceramic Structures, David B. Marshall, Brian N. Cox, Annual Review of Materials Research, Aug. 2008, vol. 38, pp. 425-443.

\* cited by examiner

*Primary Examiner* — Chi Q Nguyen
(74) *Attorney, Agent, or Firm* — Ameh IP; Lowell Campbell; Elahe Toosi

(57) ABSTRACT

A high temperature structural insulation layer is disclosed. A micro-truss structure comprises a porous lattice structure, and a protected substructure comprises at least one hole. At least one fiber non-adhesively couples the micro-truss structure to the protected substructure via the at least one fiber passing through one or more spaces within the porous lattice structure.

19 Claims, 7 Drawing Sheets

MECHANICAL ATTACHMENT FOR MICRO-TRUSS ACTIVELY COOLED STRUCTURAL INSULATION LAYER

FIELD

Embodiments of the present disclosure relate generally to attachment methods. More particularly, embodiments of the present disclosure relate to attachment methods usable in high temperature environments.

BACKGROUND

High-temperature thermally insulating structures may require mechanical attachment techniques suitable for high temperatures. Generally, a high-temperature silicone adhesive may be used. For example, a high-temperature silicone adhesive may be used for attaching insulation panels to a substructure. Advantages of using the high-temperature silicone adhesive approach include ease of applicability and strain-relief during thermal cycling. However, the high-temperature silicone adhesive may be difficult to apply on curved insulation panels and may not be easily removed when trying to replace deformed or chipped panels. In addition, the high-temperature silicone adhesive has a substantially maximum operating temperature of about 550° F., which can limit the thermal protection capabilities of the attached insulating structures.

Therefore, there is a need for systems and methods for mechanical attachment of structures in high temperature environments.

SUMMARY

A high temperature non-adhesive mechanical attachment method for coupling a micro-truss structure to a structural body is disclosed. At least one ceramic fiber is used to stitch the micro-truss structure to a substructure. The at least one ceramic fiber is stitched through open channels of the micro-truss structure and through specifically placed holes in the substructure. A thin ceramic insulation layer may be placed between the micro-truss structure and the substructure to provide strain relief during thermal cycling. Furthermore, a moldable ceramic skin on an outer surface of the micro-truss structure may be used to hold the at least one ceramic fiber in place and distribute the mechanical load.

In a first embodiment, a high temperature structural insulation layer comprises at least one fiber non-adhesively coupling a micro-truss structure to a protected substructure. The micro-truss structure comprises a porous lattice structure, and the protected substructure comprises at least one hole. The at least one fiber non-adhesively couples the micro-truss structure to the protected substructure. The at least one fiber passes through one or more spaces within the porous lattice structure.

In a second embodiment, a high temperature non-adhesive mechanical attachment for a micro-truss actively cooled structural insulation layer non-adhesively couples a micro-truss structure to a protected substructure. The high temperature non-adhesive mechanical attachment comprises the protected substructure, and the micro-truss structure comprises a porous lattice structure. The non-adhesive mechanical attachment further comprises a non-adhesive coupling means coupling the micro-truss structure to the protected substructure.

In a third embodiment, a micro-truss structure is coupled to a structural body by a non-adhesive high temperature insulation coupling method. A micro-truss structure comprising a porous lattice structure and a substructure comprising at least one hole are provided. The micro-truss structure is non-adhesively coupled to the protected substructure by passing at least one fiber through one or more spaces within the porous lattice structure.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft engines, substructure manufacturing, fiber stitching techniques, fabrication of micro-truss structures and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of practical non-limiting applications, namely, a ceramic exhaust nozzle liner. Embodiments of the disclosure, however, are not limited to such exhaust nozzle applications, and the techniques described herein may also be utilized in other structural applications. For example, embodiments may be applicable to high temperature insulation applications that require surface temperature control, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
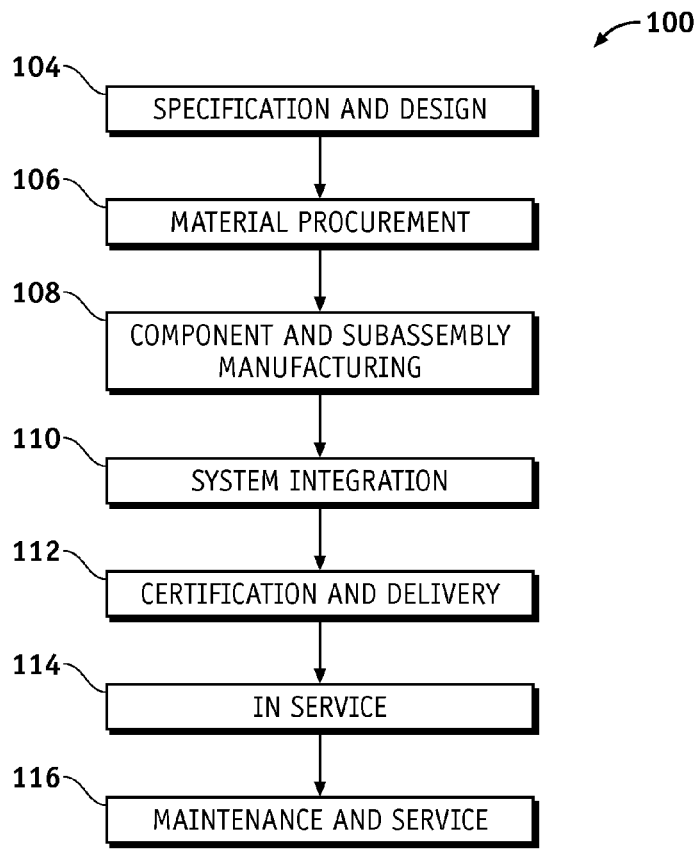
FIG. 1 is an illustration of a flow diagram of an exemplary aircraft production and service methodology.
Figure 2:
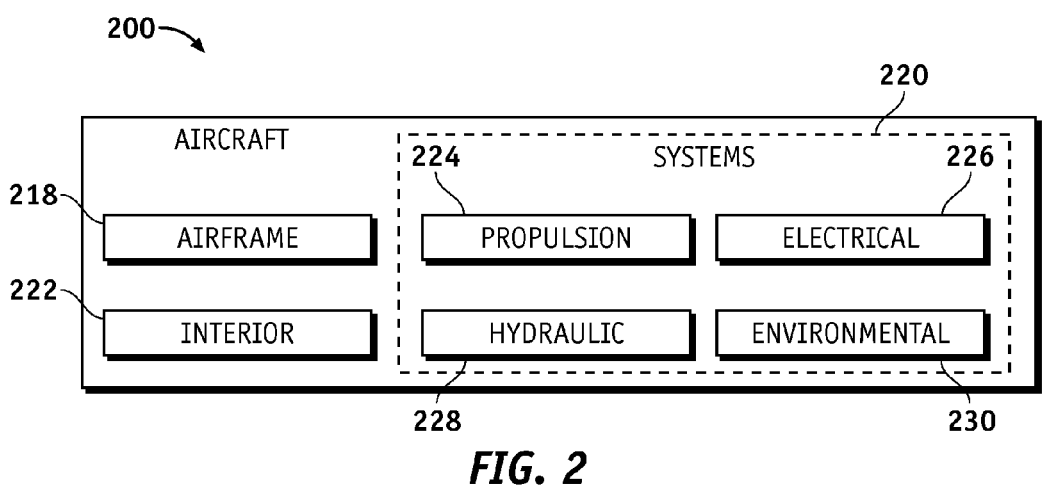
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
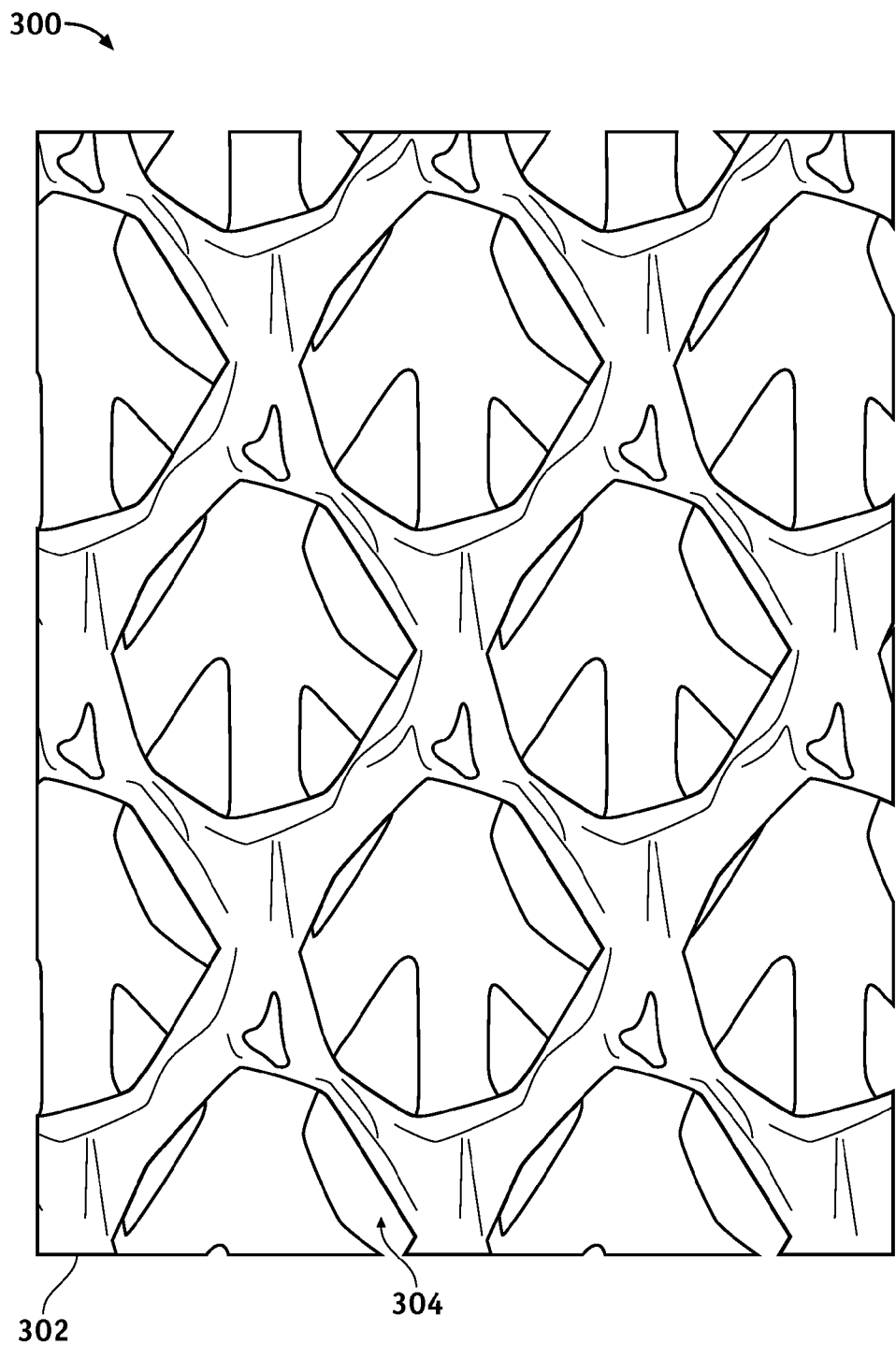
FIG. 3 is an illustration of a micro-truss structure.

FIG. 3 is an illustration of an exemplary micro-truss structure 300. The micro-truss structure 300 comprises a porous lattice structure 302 and voids 304.

Material of the porous lattice structure 302 may comprise, for example but without limitation, a ceramic, silicon carbide, alumina, a ceramic composite, a ceramic metal composite, amorphous high-temperature materials, a polymer, a metal, a metal alloy, and the like. The porous lattice structure 302 may comprise, for example but without limitation, truss members, hollow tendrils, and the like. In various embodiments, the micro-truss structure 300 may comprise, for example but without limitation, a plurality of members extending from a node and attached to a skin surface. With regard to both hollow and non-hollow truss embodiments, an overall structure may comprise a skin and one surface of the micro-truss structure 300 attached to the skin. An opposite surface of the micro-truss structure 300 is attached to a surface that is to be protected from heat flux. With the micro-truss structure 300 between the skin and the surface, a fluid flow path is formed through the voids 304 that allows for a less constricted fluid flow across the micro-truss structure 300 in comparison to reticulated foam material with approximately equal amount of porosity.

Figure 4:
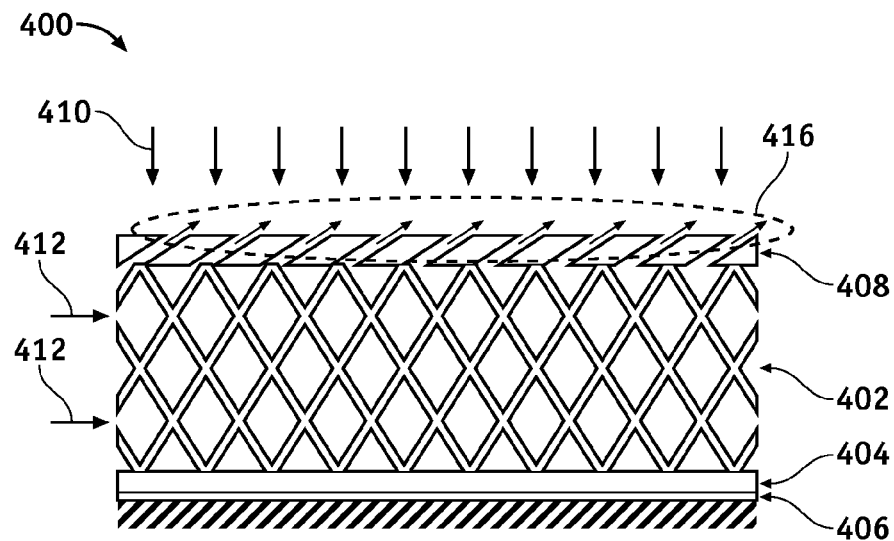
FIG. 4 is an illustration of an exemplary schematic of a micro-truss actively cooled insulation layer comprising directional cooling holes incorporated into a skin according to an embodiment of the disclosure.

One purpose of the micro-truss structure 300 is to maintain a thermal differential ($\Delta T$) between a protected surface 406 (FIG. 4) and a high heat flux 410 (FIG. 4). An ability to adjust a flow of a cooling fluid through the voids 304 of the micro-truss structure 300 enables control of a surface temperature of the protected surface 406. The cooling fluid may comprise, for example but without limitation, a gas, air, a liquid, a plasma, a mixture, a slurry, and the like. Several advantages of the micro-truss structure 300 comprise, for example but without limitation, a variety of material options, a potential for net shape fabrication, no additional machining operations for cooling gas flow channels, providing additional structural functionality, and the like.

As mentioned above an application of the embodiments may comprise, an aircraft exhaust nozzle. A robust approach may be required to attach the micro-truss structure 300 to an aircraft exhaust nozzle substructure. In this manner, the micro-truss structure 300 may comprise separate panels individually attached to an exhaust nozzle substructure as explained in more detail below.

FIG. 4 is an illustration of an exemplary schematic of a micro-truss actively cooled insulation layer 400 comprising directional cooling holes 416 incorporated into a thermal protection skin 408 according to an embodiment of the disclosure. The micro-truss actively cooled insulation layer 400 comprises a micro-truss structure 402 (300 in FIG. 3), an attachment mat 404, the protected substructure 406 (i.e., to be protected from a high heat flux), and a thermal protection skin 408.

The micro-truss structure 402 may be used to protect the protected substructure 406 requiring protection from a high heat flux 410. The thermal protection skin 408 is coupled to the micro-truss structure 402, and the protected substructure 406 is coupled to the micro-truss structure 402, using the attachment mat 404, such that the protected substructure 406 is protected from the high heat flux 410. In the embodiment shown in FIG. 4, the protected substructure 406 is protected from the high heat flux 410 by convective cooling that is provided by the cooling fluid 412 passing through the micro-truss structure 402. One purpose of the thermal protection skin 408 is to enclose the micro-truss structure 402 to allow for the flow of the cooling fluid 412.

The micro-truss structure 402 may have functions, material, and structures that are similar to the micro-truss structure 300. Therefore, common features, functions, and elements may not be redundantly described here. For temperatures exceeding approximately 400 degrees Fahrenheit (F), materials of the micro-truss structure 402 may comprise a high temperature resistant material, such as but without limitation, a metal, a ceramic, silicon carbide, alumina, and the like. Ceramic materials may be used to form the micro-truss structure 402 because properties of ceramic materials may inhibit the conduction of heat through the micro-truss structure 402 to the protected substructure 406 that requires protection from the high heat flux 410. Moreover, ceramic materials may be used because ceramic materials are generally lower in density, more thermally stable in higher temperature environments, and may have a lower thermal conductivity than metals.

A substantially total thickness of the micro-truss structure 402 may be, for example but without limitation, about 0.1 inches to about 2 inches, and the like. In one embodiment, the thickness of the micro-truss structure 402 may range, for example but without limitation, from about 0.3 inches to about 1 inch. An open volume fraction of the micro-truss structure 402 may range, for example but without limitation, from about fifty percent to about ninety-five percent, and the like.

In addition to enabling cooling flow through a structure of an actively cooled insulation layer, micro-truss materials can be utilized as a sandwich structure core material that can transfer a load between the aircraft exhaust nozzle substructure and a material of the thermal protection skin 408. Structural functionality of the micro-truss structure 402 may reduce a parasitic weight of the micro-truss actively cooled insulation layer 400. A cooling fluid may be routed through hollow truss members of the micro-truss structure 402 and an interior of the micro-truss structure 402 as described above in the context of discussion of FIG. 3. In addition, the thermal protection skin 408 may be optional and may comprise a porous material. The micro-truss structure 402 can be optimized by changing one or more of a truss cell size, a truss ligament orientation, and a ligament density when the micro-truss structure 402 is grown and/or fabricated.

The attachment mat 404 may be placed between the micro-truss structure 402 and the protected substructure 406, and may provide strain relief during thermal cycling. The attachment mat 404 may comprise a strain relief layer such as, for example but without limitation, a fiber mat, a non-rigid ceramic insulation, a thin ceramic insulation layer, and the like.

The protected substructure 406 may comprise structural bodies, such as but without limitation, structural elements of an aircraft, structural elements of an exhaust nozzle, and the like. The protected substructure 406 may comprise materials, for example but without limitation, a metallic, a composite, and the like. The embodiment shown in FIG. 4 may be utilized as part of a thermal protection system for an aircraft. The described embodiments are directed to an integrated thermally resistant structure that uses a micro-truss structure to form a composite like sandwich structure to direct heat away from a surface. The protected substructure 406 is protected from the high heat flux 410 by cooling of the micro-truss structure 402 by a cooling fluid 412 (e.g. but without limitation, air) and film cooling of the thermal protection skin 408 by the directional cooling holes 416. In one embodiment, the micro-truss structure 402 is formed using developed processes that result in hollow micro-truss structures comprising hollow truss members. In this manner, a fluid flow such as the cooling fluid 412 can be passed though one or more of the micro-truss structures such as the micro-truss structure 402 and the hollow truss members to provide cooling for surfaces such as the surface of the protected substructure 406 to be protected from large thermal gradients.

The thermal protection skin 408 may range, for example but without limitation, from about five percent to about fifty percent of a total thickness of the micro-truss actively cooled insulation layer 400.

If the thermal protection skin 408 comprises an impervious material, incident thermal energy conducts through the material from which the members of micro-truss structure 402 are fabricated towards the protected substructure 406 requiring protection from the high heat flux 410. For example, an impervious skin material may be a ceramic fiber reinforced ceramic matrix composite (CMC). The cooling fluid 412 can be directed through the micro-truss structure 402 providing a convective cooling mechanism to maintain a desired temperature difference. The temperature of the cooling fluid 412 directed through the micro-truss structure 402 can increase as the cooling fluid 412 removes heat from the micro-truss structure 402. This phenomenon can reduce an efficiency of the cooling fluid 412 as an effective path length through the micro-truss structure 402 increases, due to a decreasing temperature differential between the cooling fluid 412 and the thermal protection skin 408.

A temperature differential between the thermal protection skin 408 and the protected substructure 406 may be controlled by passing the cooling fluid 412 through the micro-truss structure 402. In addition, the thermal protection skin 408 may be porous, enabling cooling fluid to flow from the micro-truss structure 402 onto the high heat flux 410, providing a transpiration mechanism. The protected substructure 406 can be protected from the high heat flux 410 by convective cooling of the micro-truss structure 402 and transpiration cooling at the surface 102 of thermal protection skin 408. This active cooling mechanism reduces the skin temperature for a given heat flux (compared to an impervious skin material with a similar thermal conductivity), thus reducing an amount of heat conducted through the micro-truss structure 402. Examples of porous materials comprise sintered particles and/or fibers that create an open porosity of greater than about 10%. For porous ceramic skin material, particles and/or fibers may be comprised of, for example but without limitation, oxide or non-oxide constituents, and the like.

The thermal protection skin 408 may be fabricated to comprise a plurality of aligned holes such as the directional cooling holes 416 that enable the cooling fluid 412 to flow from the micro-truss structure 402, through the aligned holes, towards the high heat flux 410 providing a film cooling mechanism. The protected substructure 406 can also be protected from the high heat flux 410 by convective cooling of the micro-truss structure 402 and by film cooling at the thermal protection skin 408. The aligned holes can be conventionally drilled or laser machined perpendicular to, or at an angle off a normal to the thermal protection skin 408. The micro-truss structure 402 can be configured enabling a predictable cooling fluid flow pattern.

Figure 5:
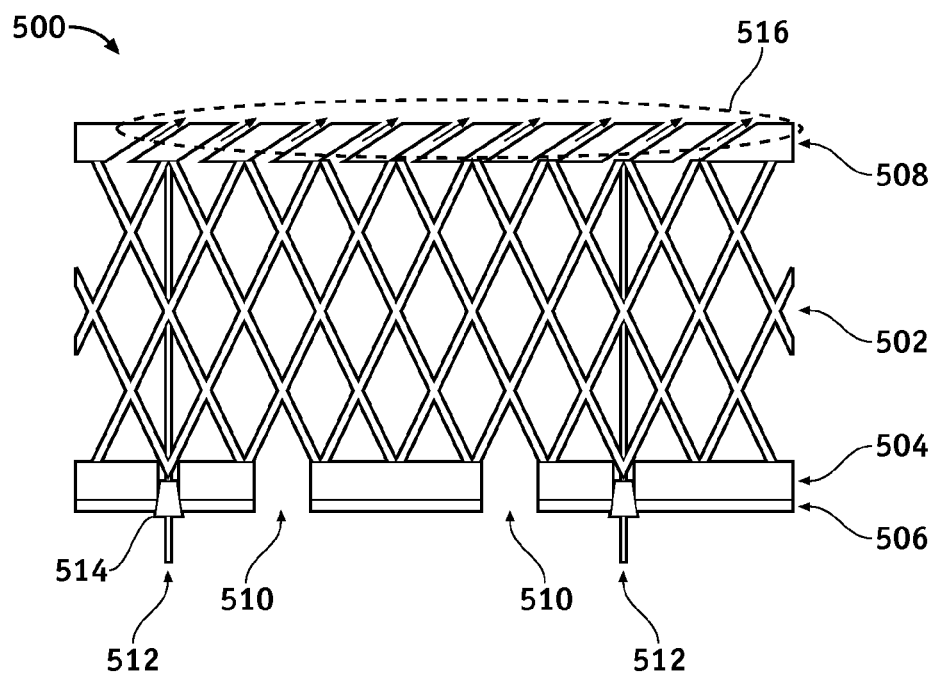
FIG. 5 is an illustration of an exemplary schematic of a mechanical attachment approach for a micro-truss actively cooled insulation layer according to an embodiment of the disclosure.

FIG. 5 is an illustration of an exemplary schematic of a non-adhesive mechanical attachment approach for a micro-truss actively cooled insulation layer 500 according to an embodiment of the disclosure. The micro-truss actively cooled insulation layer 500 comprises a ceramic micro-truss structure 502 (300 in FIG. 3, 402 in FIG. 4), a strain relief ceramic insulation 504, a protected substructure 506, a ceramic skin 508 (e.g., a fibrous ceramic), a plurality of holes 510, and at least one fiber tow 512 comprising a plurality of fibers. The micro-truss actively cooled insulation layer 500 may have functions, material, and structures that are similar to the embodiments shown in FIGS. 3 and 4. Therefore common features, functions, and elements may not be redundantly described here.

The non-adhesive mechanical attachment approach stitches the ceramic micro-truss structure 502 to the protected substructure 506 with at least one fiber of the at least one fiber tow 512. The at least one fiber of the at least one fiber tow 512 is stitched through natural open channels of the ceramic micro-truss structure 502 and through the holes 510 specifically placed in the protected substructure 506. Some or all of the holes 510 in the protected substructure 506 can provide a path for cooling fluid to flow from a duct below the protected substructure 506 into the ceramic micro-truss structure 502 and subsequently into a hot exhaust gas stream through cooling holes 516 in the ceramic skin 508. The ceramic skin 508 may also be in contact with the hot exhaust gas stream. Additional holes 510 can be added to the protected substructure 506 to suitably provide the path for the cooling fluid as needed.

The at least one fiber tow 512 may comprise, for example but without limitation, a high temperature ceramic fiber tow (hereinafter referred to as a ceramic fiber tow 512) such as Nextel 312 thread manufactured by 3M, and the like. The ceramic fiber tow 512 may be coupled to the protected substructure 506 and the ceramic skin 508 under tension to hold individual panels of the micro-truss actively cooled insulation layer 500 in place. A substantially total force required to hold the individual panels in place may be distributed between discrete fibers of the ceramic fiber tow 512. Increasing a number of fibers used to couple each individual panel in place reduces a tensile force on each fiber. A number of fibers per panel (or the stitching density) can be increased until a safe operating force is reached. Thus, the embodiment shown in FIG. 5 is scalable.

At least one ceramic fiber of the ceramic fiber tow 512 may be stitched through the ceramic micro-truss structure 502 and the holes 510 to form a loop (708 in FIG. 7) through two holes of the holes 510. Alternately or in addition to, the at least one ceramic fiber of the ceramic fiber tow 512 may be stitched through the ceramic micro-truss structure 502 and a tow fixture 514 in a single hole of the holes 510. The at least one ceramic fiber of the ceramic fiber tow 512 may be stitched around the tow fixture 514 to secure the ceramic fiber tow 512 to the protected substructure 506. The tow fixture 514 may comprise, for example but without limitation, a ceramic plug, and the like. A moldable ceramic skin (not shown) may be used on an outer surface of the ceramic micro-truss structure 502 to help hold the ceramic fiber tow 512 in place and distribute a mechanical load.

Embodiments of the disclosure can non-adhesively secure a high temperature micro-truss insulation layer to, for example but without a limitation, an exhaust duct substructure, and the like, without use of adhesive materials such as glue, and the like. In this manner, the exhaust duct substructure may have an operating temperature range of, for example but without limitation, about 2200° F. to about 3500° F., and the like. In contrast, an adhesive used to secure a micro-truss insulation layer to an exhaust duct substructure may operate in a temperature range of the exhaust duct substructure that may be about 500° F. to about 600° F. Advantages of the embodiments may comprise, for example but without limitation: no additional machining for the ceramic micro-truss structure 502; ceramic fibers may be stitched through existing open channels of the ceramic micro-truss structure 502; compatibility with tiling concepts for the ceramic micro-truss structure 502; may be used for complex curvatures; removability for repairs/replacement, and the like.

Figure 6:
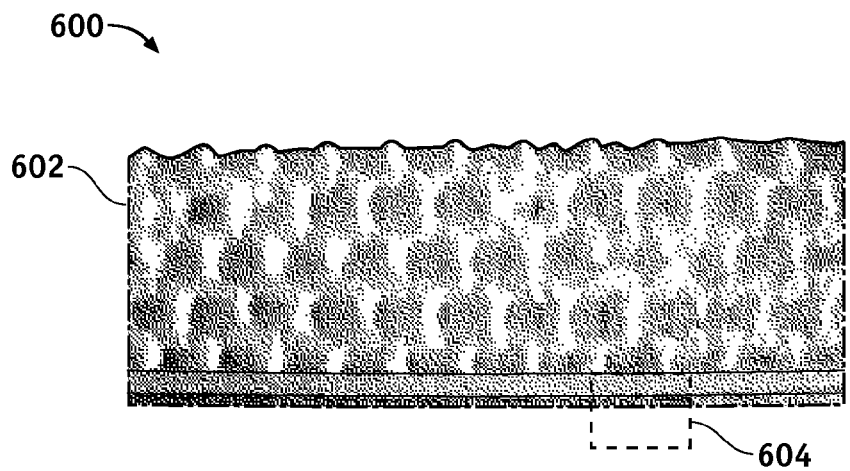
FIG. 6 is an illustration of an exemplary mechanical attachment approach according to an embodiment of the disclosure.
Figure 7:
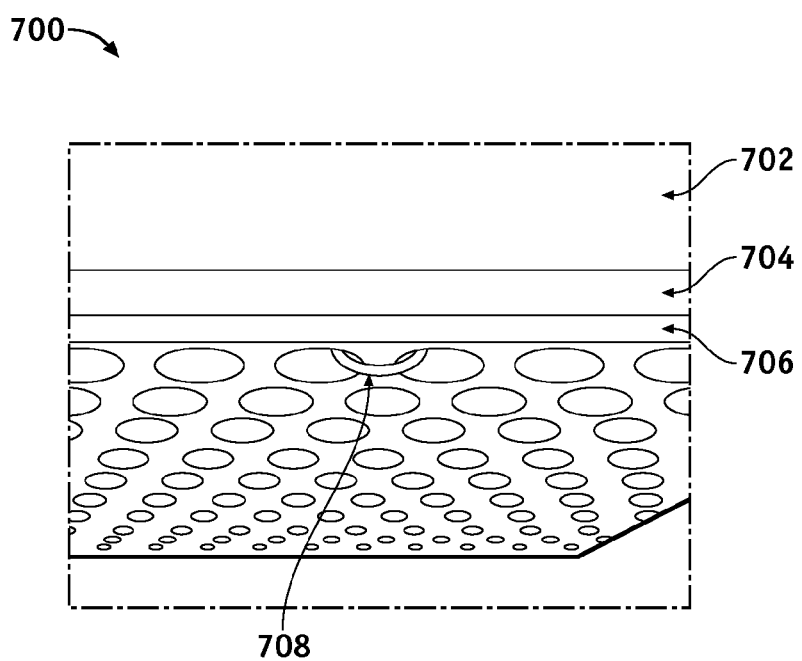
FIG. 7 is an illustration of a zoomed view of a portion of the FIG. 6.

FIG. 6 is an illustration of an exemplary mechanical attachment approach 600 according to an embodiment of the disclosure. FIG. 7 is an illustration of a zoomed view 700 of a boxed area 604 of FIG. 6. In the embodiment shown in FIGS. 6-7, at least one ceramic fiber of the ceramic fiber tow 708 is looped through holes in a protected substructure 706. One aspect of any attachment approach that involves dissimilar materials is an ability to compensate for a coefficient of thermal expansion (CTE) mismatch that may fracture an adhesive attachment. For mechanical attachment approach 600, a thin ceramic insulation layer such as the ceramic fiber mat 704 can be placed between a ceramic micro-truss structure 602/702 and the protected substructure 706 to provide strain relief during thermal cycling. The ceramic fiber mat 704 may be compressed between the ceramic micro-truss structure 602/702 and the protected substructure 706 and held in a compressed state by tensile forces in the at least one ceramic fiber of the ceramic fiber tow 708.

Figure 8:
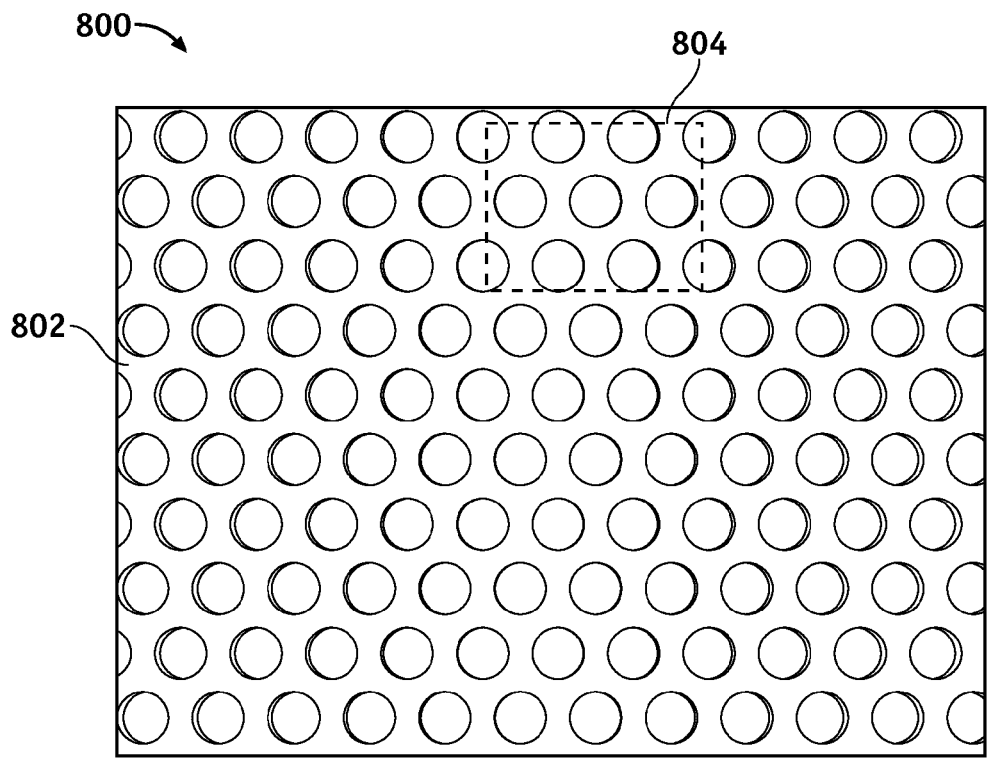
FIG. 8 is an illustration of an exemplary ceramic fiber mat used for strain isolation between a ceramic micro-truss structure and a substructure according to an embodiment of the disclosure.
Figure 9:
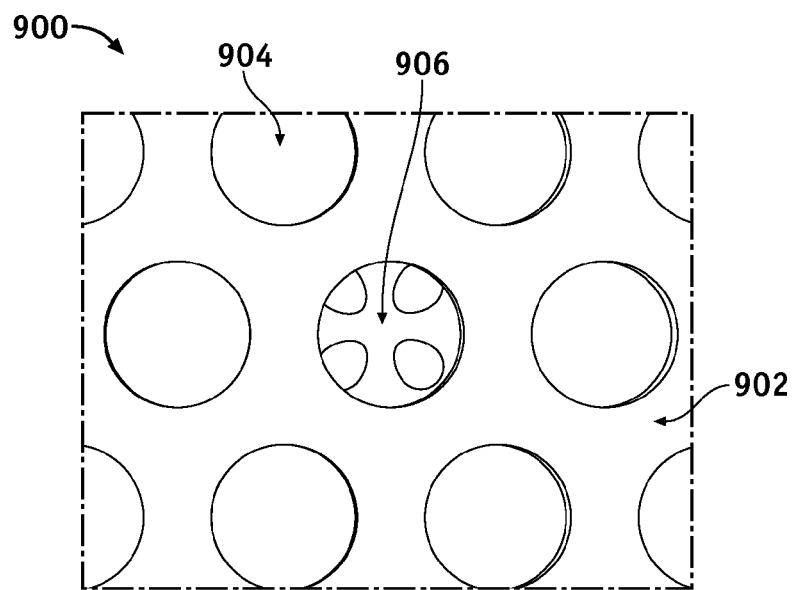
FIG. 9 is an illustration of a zoomed view of a portion of the FIG. 8.

FIG. 8 is an illustration of an exemplary ceramic fiber mat 800 used for strain isolation between the ceramic micro-truss structure 602/702 and the protected substructure 706 according to an embodiment of the disclosure. FIG. 9 is an illustration of a zoomed view 900 of a boxed area 804 of FIG. 8. A porosity 802 of the ceramic fiber mat 800 can used to allow cooling fluid to flow from below the protected substructure 706 into an open volume of the ceramic micro-truss structure 602/702. Alternately, if the ceramic fiber mat 800 generates excessive resistance for cooling fluid flow, a hole 906 in the ceramic fiber mat 800 can be aligned with the holes 510 in the protected substructure 706. A surface 902 of the ceramic fiber mat 800 may comprise holes such as the hole 906, and/or dimples 904 that do not provide a through for cooling fluid flow. Strain relief compressibility in the ceramic fiber mat 800 (strain relief layer) may result from a thickness and a compressibility of the ceramic fiber mat 800 and a tension in the at least one ceramic fiber of the ceramic fiber tow 708. In addition to providing strain relief between the ceramic micro-truss structure 602/702 and the protected substructure 706, the ceramic fiber mat 800 can provide an additional layer of thermal protection with minimal impact to the overall mass of the micro-truss actively cooled insulation layer 500.

Figure 10:
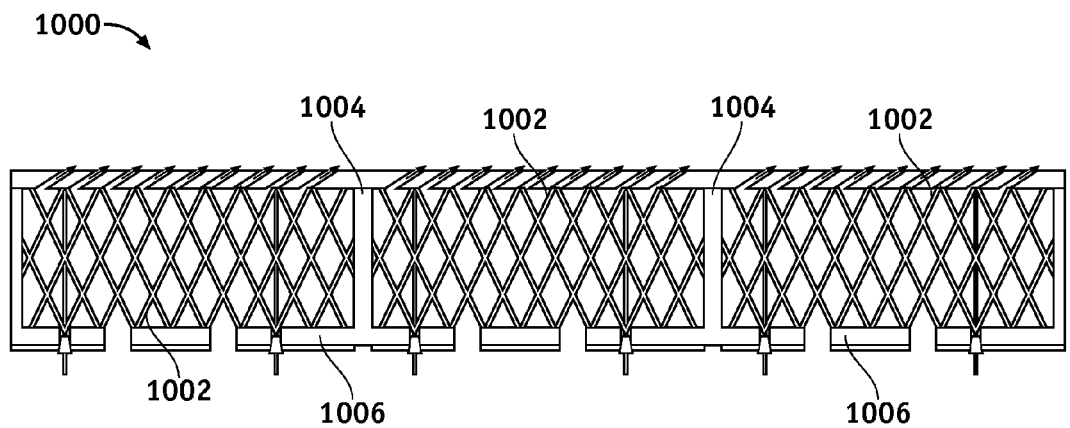
FIG. 10 is an illustration of a schematic showing an exemplary tiled panels attached to an exhaust nozzle substructure using a mechanical attachment approach according to an embodiment of the disclosure.

FIG. 10 is an illustration of a schematic representing exemplary tiled panels 1000 that are attached to the exhaust nozzle substructure with the described mechanical attachment approach according to an embodiment of the disclosure. The non-adhesive mechanical attachment approach is also compatible with tiling a plurality of ceramic micro-truss panels 1002 to cover a larger substructure area. In an embodiment, the ceramic micro-truss panels 1002 are, for example but without limitation, each less than about 24"× about 24", and the like. Each of the ceramic micro-truss panels 1002 may be fabricated to match a shape (curvature) of a substructure for a specific area. In one embodiment, a ceramic fiber mat 1006 can also be placed as a side mat 1004 to relieve strain at adjacent ceramic micro-truss panels 1002. A compressible ceramic fiber side mat such as the side mat 1004 can compensate for in-plane thermal expansion of the ceramic micro-truss panels 1002 during operation.

Figure 11:
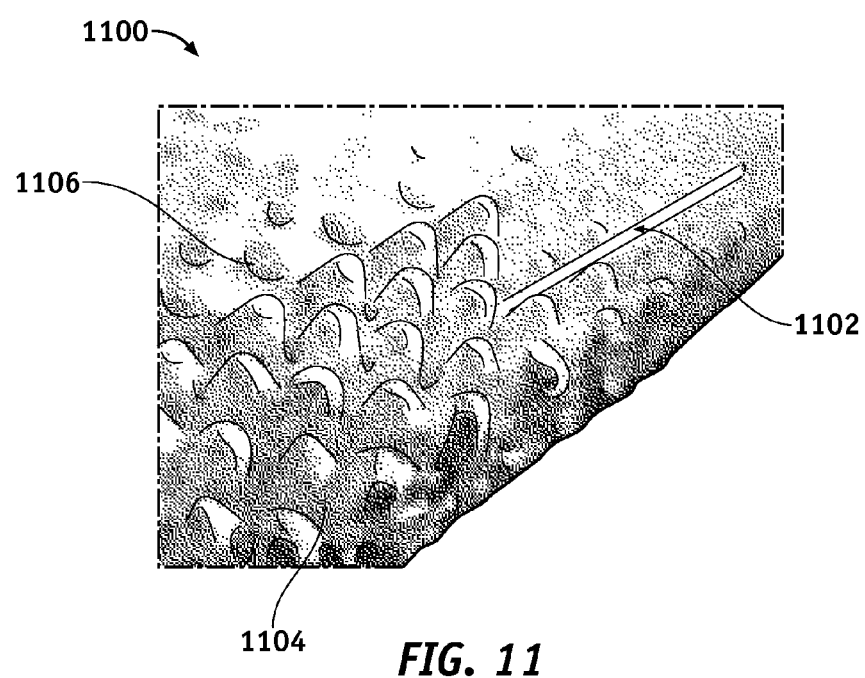
FIG. 11 is an illustration of an exemplary ceramic fiber tow used to stitch though a ceramic micro-truss according to an embodiment of the disclosure.

FIG. 11 is an illustration of an exemplary structure 1100 showing a ceramic fiber tow 1102 used to stitch though a ceramic micro-truss structure 1104 comprising a moldable ceramic skin 1106 thereon according to an embodiment of the disclosure. At least one ceramic fiber of the ceramic fiber tow 1102 passes through the voids 304 (FIG. 3) of the ceramic micro-truss structure 1104 before applying the moldable ceramic skin 1106. In the embodiment shown in FIG. 11, the moldable ceramic skin 1106 is not applied over the ceramic fiber tow 1102. The moldable ceramic skin 1106 can provide, for example but without limitation, at least three functions: 1) enclosing an open volume of the ceramic micro-truss structure 1104 for cooling fluid flow, 2) holding the ceramic fiber tow 1102 in place, and 3) helping distribute the mechanical load generated from the at least one ceramic fiber of the ceramic fiber tow 1102 over a large area of the ceramic micro-truss structure 1104. In an embodiment, the moldable ceramic skin 1106 is made of a highly moldable, high purity alumina ceramic composite, reinforced with alumina fibers. A moldable skin such as the moldable ceramic skin 1106 is advantageous for non-adhesive mechanical attachment because the skin can be applied to the ceramic micro-truss structure 1104 after it is fired and after stitching of the at least one ceramic fiber of the ceramic fiber tows such as the ceramic fiber tow 1102. The moldable ceramic skin 1106, which can have the consistency of thick putty depending on its level of hydration, can be applied with enough pressure to embed a first layer of nodes on a surface of the ceramic micro-truss structure 1104. A low-temperature firing can permanently dry the moldable ceramic skin 1106 onto the ceramic micro-truss structure 1104.

Depending on the tiling approach, the moldable ceramic skin 1106 can be applied substantially only to a surface in contact with the hot exhaust gas, or the moldable ceramic skin 1106 can also be applied to the sides and/or bottom of each of the ceramic micro-truss panel 1002. If the skin material is applied to one or more sides and a bottom of each of the ceramic micro-truss panel 1002, the cooling flow between the tiles of the ceramic micro-truss panels 1002 can be isolated. The moldable ceramic skin 1106 can also be compatible with net-shape manufacturing of the ceramic micro-truss panels 1002 and with the aligned cooling holes of the holes 510 described above. The aligned cooling holes of the holes 510 in the moldable ceramic skin 1106 can be quickly and inexpensively formed by piercing or punching the holes 510 while the skin is in a soft moldable state. As an alternative, the holes 510 can be laser drilled after the ceramic skin is dried and hardened. In one embodiment, the moldable ceramic skin can be pressed into the ceramic micro-truss with enough pressure to generate a dimpled texture on the surface. The surface profile can be controlled by changing the physical dimensions of the ceramic micro-truss, and/or changing the thickness and application pressure of the moldable ceramic skin 1106. This approach to a dimpled surface texture can be utilized for boundary layer control of the hot exhaust gases as the hot exhaust gases flow through the exhaust nozzle liner.

Figure 12:
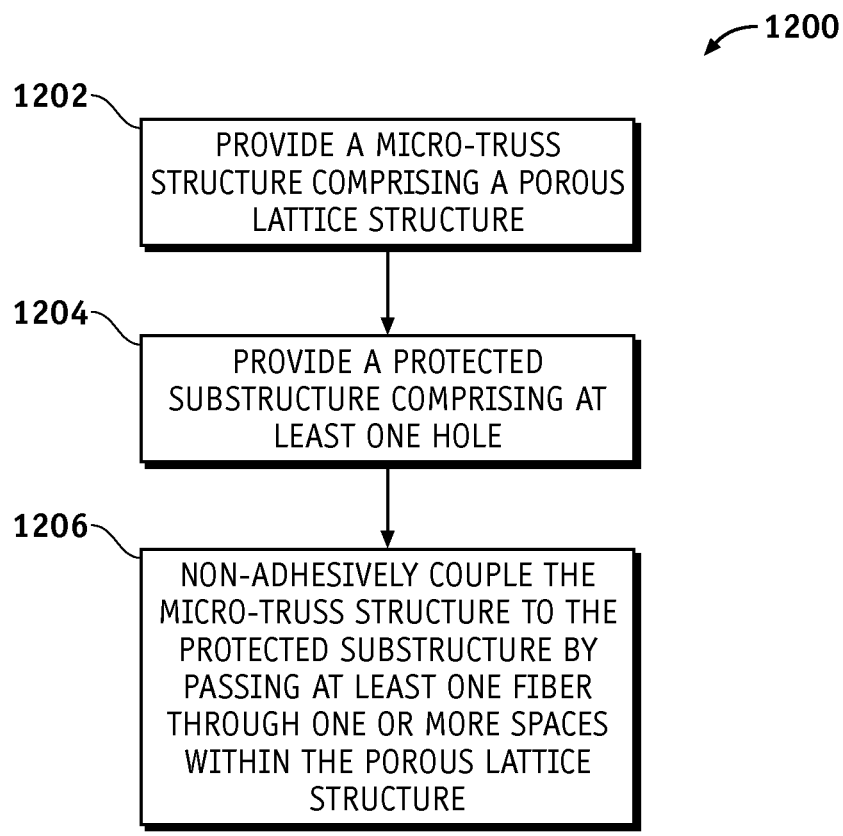
FIG. 12 is an illustration of an exemplary flow chart showing a process for non-adhesively coupling a micro-truss structure to a structural body, according to an embodiment of the disclosure.

FIG. 12 is an illustration of an exemplary flow chart showing a process 1200 for non-adhesively coupling a micro-truss to a structural body according to an embodiment of the disclosure. The various tasks performed in connection with process 1200 may be performed mechanically, by software, hardware, firmware, or any combination thereof. For illustrative purposes, the following description of process 1200 may refer to elements mentioned above in connection with FIGS. 3-11. In practical embodiments, portions of the process 1200 may be performed by different elements of the micro-truss actively cooled insulation layers 400-500 such as the micro-truss structure 402, the attachment mat 404, the protected substructure 406, and the thermal protection skin 408, the holes 510, and the at least one ceramic fiber of the at least one fiber tow 512. Process 1200 may have functions, material, and structures that are similar to the embodiments shown in FIGS. 3-11. Therefore common features, functions, and elements may not be redundantly described here.

Process 1200 may begin by providing a micro-truss structure comprising a porous lattice structure (task 1202).

Process 1200 may then continue by providing a protected substructure comprising at least one hole (task 1204).

Process 1200 may then continue by non-adhesively coupling the micro-truss structure to the protected substructure by passing at least one fiber through one or more spaces within the porous lattice structure (task 1206).

In this way, various embodiments of the disclosure provide a method and structural insulation layers for non-adhesive mechanical attachment of structures in high temperature environments, thereby allowing structural bodies to operate in substantially higher temperature than that provided by existing methods.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 9-16 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A high temperature structural insulation layer comprising:
    a ceramic micro-truss structure comprising a porous lattice structure operable for a fluid flow;
    a protected substructure comprising at least one hole; and
    at least one fiber passing through one or more spaces within the porous lattice structure, and non-adhesively coupling the ceramic micro-truss structure to the protected substructure, and coupled under tension to a tow fixture coupled to the at least one hole.

2. The high temperature structural insulation layer according to claim 1, wherein the at least one fiber passes through the at least one hole.

3. The high temperature structural insulation layer according to claim 2, wherein passing the at least one fiber through the at least one hole couples the micro-truss structure to the protected substructure.

4. The high temperature structural insulation layer according to claim 1, wherein the at least one fiber is coupled under tension to a plug fixture coupled to the at least one hole.

5. The high temperature structural insulation layer according to claim 1, wherein the protected substructure comprises at least one of the group consisting of: a metal, and a composite.

6. The high temperature structural insulation layer according to claim 1, wherein the at least one fiber comprises a ceramic fiber.

7. The high temperature structural insulation layer according to claim 1, further comprising a ceramic fiber mat placed between the ceramic micro-truss structure and the protected substructure.

8. The high temperature structural insulation layer according to claim 7, wherein the ceramic fiber mat comprises a porosity operable to allow a flow of a cooling fluid.

9. The high temperature structural insulation layer according to claim 1, further comprising a ceramic skin coupled to the ceramic micro-truss structure.

10. The high temperature structural insulation layer according to claim 9, wherein the ceramic skin comprises at least one aligned cooling hole.

11. The high temperature structural insulation layer according to claim 10, wherein the at least one aligned cooling hole is formed in the ceramic skin when the ceramic skin is in a moldable state.

12. The high temperature structural insulation layer according to claim 9, wherein the ceramic skin is impervious to a cooling fluid flow.

13. The high temperature structural insulation layer according to claim 9, wherein a ceramic fiber is in contact with the ceramic skin.

14. The high temperature structural insulation layer according to claim 9, wherein the ceramic skin is operable for contact with a hot exhaust gas.

15. The high temperature structural insulation layer according to claim 1, wherein the porous lattice structure comprises hollow truss members.

16. The high temperature structural insulation layer according to claim 1, further comprising a fluid flow path through the ceramic micro-truss structure configured to be less constricted for the fluid flow than a foam material with approximately equal porosity.

17. The high temperature structural insulation layer according to claim 1, wherein the ceramic micro-truss structure does not comprise a foam material.

18. A high temperature insulation method for non-adhesively coupling a micro-truss structure to a structural body comprising:
    providing a ceramic micro-truss structure comprising a porous lattice structure operable for a fluid flow of a cooling fluid and comprising a plurality of members extending from a node;
    providing a protected substructure comprising at least one hole; and
    non-adhesively coupling the ceramic micro-truss structure to the protected substructure by passing at least one fiber through one or more spaces within the porous lattice structure and coupling the at least one fiber under tension to a tow fixture coupled to the at least one hole.

19. The method of claim 18, further comprising:
    coupling a porous thermal protection skin to the ceramic micro-truss structure under tension, wherein the thermal protection porous skin comprises a plurality of directional cooling holes;
    routing the cooling fluid through the ceramic micro-truss structure; and
    transpiring the cooling fluid on a surface of the porous thermal protection skin.

* * * * *